(12) United States Patent
Shi

(10) Patent No.: US 12,488,088 B2
(45) Date of Patent: Dec. 2, 2025

(54) SYSTEM AND METHOD FOR IN DETECTION OF MALICIOUS BEHAVIOR IN SOFTWARE UPDATES TO PREVENT SOFTWARE SUPPLY CHAIN ATTACKS

(71) Applicant: Barracuda Networks, Inc., Campbell, CA (US)

(72) Inventor: Fleming Shi, Scotts Valley, CA (US)

(73) Assignee: Barracuda Networks, Inc., Campbell, CA (US)

( * ) Notice: Subject to any disclaimer, the term of this patent is extended or adjusted under 35 U.S.C. 154(b) by 764 days.

(21) Appl. No.: 17/465,572

(22) Filed: Sep. 2, 2021

(65) Prior Publication Data

US 2023/0017989 A1    Jan. 19, 2023

Related U.S. Application Data

(60) Provisional application No. 63/222,278, filed on Jul. 15, 2021.

(51) Int. Cl.
*G06F 21/53* (2013.01)
*G06F 8/65* (2018.01)
*G06F 21/56* (2013.01)
*G06F 21/57* (2013.01)

(52) U.S. Cl.
CPC ............. *G06F 21/53* (2013.01); *G06F 8/65* (2013.01); *G06F 21/566* (2013.01); *G06F 21/572* (2013.01); *G06F 2221/033* (2013.01)

(58) Field of Classification Search
CPC ...... G06F 21/53; G06F 21/566; G06F 21/572; G06F 8/65
See application file for complete search history.

(56) References Cited

U.S. PATENT DOCUMENTS

| 10,607,011 B1 * | 3/2020 | Orhan | G06F 21/566 |
| 10,623,417 B1 * | 4/2020 | Hohler | G06F 21/51 |
| 11,341,245 B1 * | 5/2022 | Voss | G06F 11/2094 |

(Continued)

OTHER PUBLICATIONS

Li, Hong Jhe; Tien, Chia-Wei; Tien, Chin-Wei; Lin, Chih-Hung; Lee, Hahn-Ming; Jeng, Albert B.; "AOS: an optimized sandbox method used in behavior-based malware detection," IEEE, International Conference on Machine Learning and Cybernetics, Guilin, China, Jul. 2011, pp. 404-409.*

(Continued)

*Primary Examiner* — Victor Lesniewski

(57) ABSTRACT

A new approach is proposed to support software update verification and malicious behavior detection. When a software update package is being delivered by a software vendor to an intended recipient, a software update registry intercepts the software update package and installs the software update on a software update sandbox regardless of the size of the software update package. All behaviors of the software update during unpacking, installation, and post-installation operations are monitored and analyzed by the software update sandbox to verify that there is no malicious behavior or component in the software update package. If the software update is verified to be safe, then the software update package is delivered to the intended recipient for installation. If the software update is determined to be unsafe, then the software update will be blocked.

23 Claims, 2 Drawing Sheets

(56) References Cited

U.S. PATENT DOCUMENTS

| | | | | |
|---|---|---|---|---|
| 2013/0145463 A1* | 6/2013 | Ghosh | G06F 21/53 726/22 |
| 2015/0193223 A1* | 7/2015 | Cardamore | G06F 9/44 717/170 |
| 2017/0308701 A1* | 10/2017 | Nandha Premnath | G06F 21/53 |
| 2017/0337372 A1* | 11/2017 | Zhang | G06F 21/53 |
| 2018/0054449 A1* | 2/2018 | Nandha Premnath | G06F 21/566 |
| 2018/0137282 A1* | 5/2018 | Rasanen | G06F 21/566 |
| 2019/0052651 A1* | 2/2019 | Cheetancheri | G06F 21/566 |
| 2019/0188383 A1* | 6/2019 | Cafasso | G06F 21/554 |
| 2019/0213325 A1* | 7/2019 | McKerchar | G06F 21/51 |
| 2021/0319108 A1* | 10/2021 | Segal | G06F 21/53 |
| 2022/0114257 A1* | 4/2022 | McKerchar | G06F 9/45558 |

OTHER PUBLICATIONS

Jia, Peng; He, Xiang; Liu, Liang; Gu, Binjie; Fang, Yong; "A framework for privacy information protection on Android," IEEE, International Conference on Computing, Networking and Communications (ICNC), Garden Grove, CA, USA, Feb. 2015, pp. 1127-1131.*

* cited by examiner

SYSTEM AND METHOD FOR IN DETECTION OF MALICIOUS BEHAVIOR IN SOFTWARE UPDATES TO PREVENT SOFTWARE SUPPLY CHAIN ATTACKS

CROSS-REFERENCE TO RELATED APPLICATIONS

This application claims the benefit of U.S. Provisional Patent Application No. 63/222,278, filed Jul. 15, 2021, which is incorporated herein in its entirety by reference.

BACKGROUND

There have been rampant ransomware attacks and data breaches lately hitting businesses, government organizations, and critical infrastructure operations. Many of these attacks utilize software supply chains to drive their effectiveness. A software supply chain attack seeks to damage a business entity by targeting and installing undetectable malware at one or more elements (e.g., servers, laptops and even mobile devices) in its software supply chain by delivering a software update package (or a software update) to the one or more elements. The software update package may include malware components to be installed as a new software or as an update to an existing software at the one or more elements of the software supply chain in order to launch a cyberattack. For examples, from XCodeGhost to 2017 Petya/NotPetya, these software supply chain attacks are betting on the trust of software vendors to deliver their cyber weapons to the elements rapidly via software updates and such attacks are more difficult to stop because most of these software updates happen automatically in the background. Because of the deliberate evasive maneuver by the attacks to take advantage of software updates, end users do not even have to click on a malicious link or open a malicious file for the software supply chain attacks to be launched.

Currently, signature-based anti-virus (AV) software are good for detecting known threats or identifying malicious software zero-day threats that have not been seen before via advanced persistent threat (APT) protection. The APT malware analysis tools intercept incoming threats usually targeting humans, where a malicious file attachment or a link that can lead to a malicious file are the usual suspects. Software update packages, however, are commonly distributed by trusted software vendors and are digitally signed by the vendors and intermediate certificate authorities, where malicious components of these software updates can be well-hidden inside the software update packages. When signature or checksum-based validations are triggered, these software update packages will always pass; therefore, the malicious components in the packages are disguised well enough to the point of installation. As a result, AV software cannot stop the software supply chain attacks delivered via the software updates because the AV software will not be triggered in the right place in the software supply chain or the AV software does not have the proper analysis capabilities to identify the software supply chain attack in time. Even during installation, the malicious components may not exhibit any bad behavior, thus evasive to AV and endpoint APT defense. Additionally, the AV and APT software are often size-limited (e.g., they generally assume that the attackers are not going to construct a weapon/artifact/file greater than 10 MB in size), while software update packages are often 100's of MBs or GBs in size (e.g., an OS update). Currently, scanning very large files is inconvenient and deemed unnecessary given the assumption that attackers want portability. To make matters worse, the attackers have demonstrated their abilities to get into the software vendors' infrastructure, and sometimes, the build process of the software updates to construct their cyber weapons (e.g., the malicious components). Since these software update packages are usually not delivered via traditional attack surfaces where existing AV and APT defenses exist, they can sneak through undetected without much human interactions.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
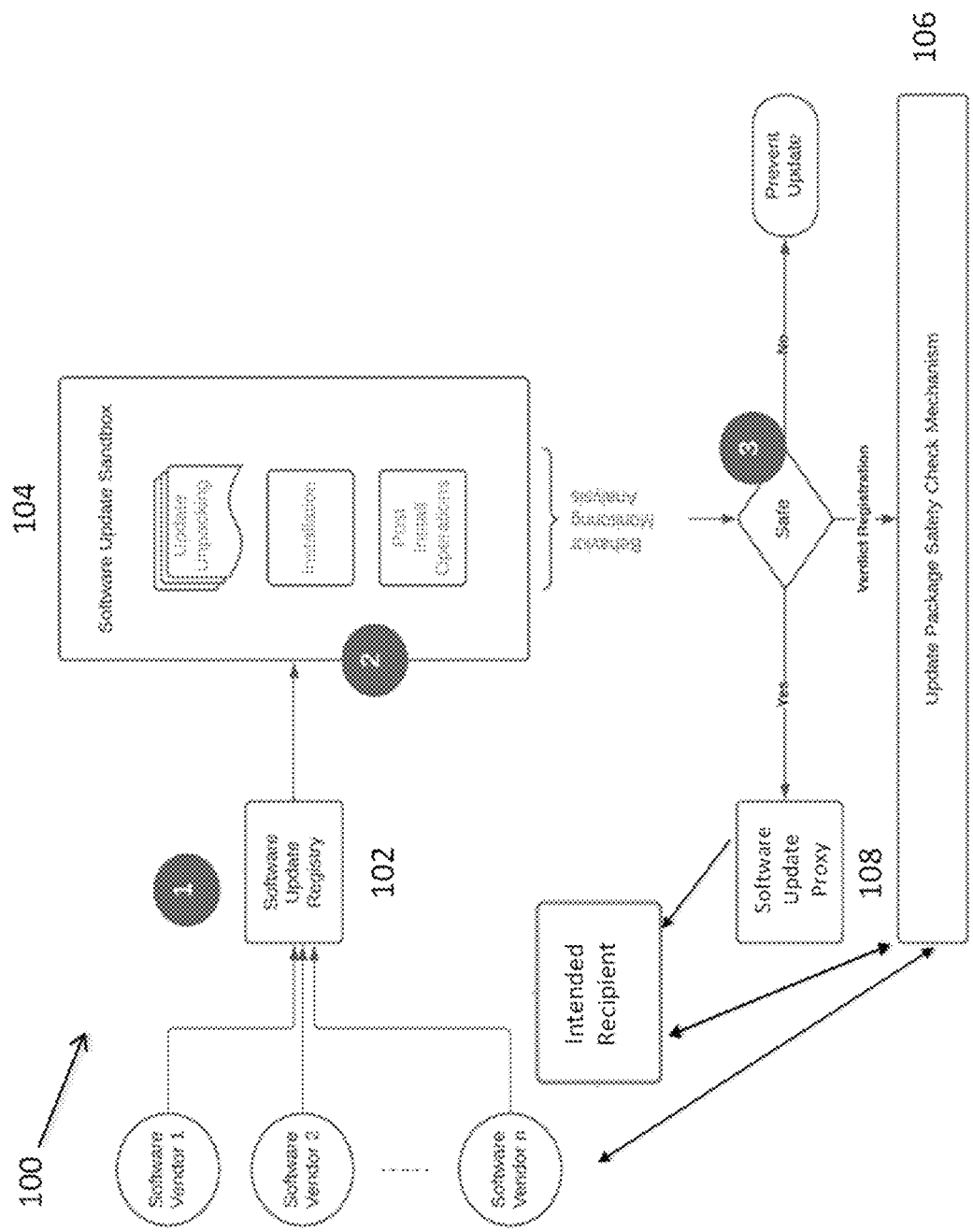
FIG. 1 depicts an example of a system diagram to support software update verification and malicious behavior detection in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support software update verification and malicious behavior detection. When a software update package is being delivered by a software vendor to an intended recipient (e.g., a server or an endpoint), a software update registry intercepts the software update package and installs the software update on a software update sandbox instead of the intended recipient of the software update package regardless of the size of the software update package. Once the software update has been installed on the software update sandbox, all behaviors of the software update during unpacking, installation, and post-installation operations are monitored and analyzed by the software update sandbox to verify that there is no malicious behavior or component in the software update package. If the software update is verified to be safe, then the software update package can be delivered to the intended recipient for installation. If the software update is determined to be unsafe, then the software update will be blocked. The verdict on the software update package is registered with an update package safety check cache mechanism.

The proposed approach adopts a verify-first, deliver-second process of software updates, which enables a more thorough examination of the software update compared to existing APT defense and AV solutions. The proposed approach also forces a change to the software update process, which, unlike size-limited APT malware analysis, identifies threats in the software update without any constraints on one or more of file type, file size, or delivery behavior of the software update. As such, the proposed approach is able to prevent cyber threats hidden in software update packages from trusted software vendors and effectively apply a zero-trust policy on all software updates without dependency on the reputation of the software vendors. Furthermore, the proposed approach improves visibility in the early detection of software supply chain attacks.

FIG. 1 depicts an example of a system diagram 100 to support software update verification and malicious behavior detection. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a software update registry 102, a software update sandbox 104, an optional software update package safety check cache/mechanism 106, and an optional software update proxy 108. These components in the system 100 each run on one or more computing units/appliances/devices/hosts (not shown) each with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units, which becomes a special purposed one for practicing the processes. The processes may also be at least partially embodied in the computing units into which computer program code is loaded and/or executed, such that the host becomes a special purpose computing unit for practicing the processes.

In the example of FIG. 1, each computing unit can be a computing device, a communication device, a storage device, or any computing device capable of running a software component. For non-limiting examples, a computing device can be but is not limited to a server machine, a laptop PC, a desktop PC, a tablet, a Google Android device, an iPhone, an iPad, and a voice-controlled speaker or controller. Each of the components in the system 100 is associated with a communication network (not shown), which can be but is not limited to Internet, intranet, wide area network (WAN), local area network (LAN), wireless network, Bluetooth, WiFi, and mobile communication network for internal communications among entities, components, and users of an organization. The physical connections of the communication network and the communication protocols are well known to those of skilled in the art.

In the example of FIG. 1, the software update registry 102 is configured to maintain, track and publish a plurality of software updates by one or more software vendors which have registered with the software update registry 102 to provide updates or patches to software utilized by an organization or a company. In some embodiments, the software update registry 102 is a centralized service located at, for example, a gateway or firewall to an internal network or information technology (IT) infrastructure of the organization. In some embodiments, the software update registry 102 is a single entry of one or more entries to access different parts of the internal network/IT infrastructure depending on the proximity of the one or more entries to the actual workloads in the internal network/IT infrastructure. In some embodiments, however, the software update registry 102 is a distributed service located at different locations of the organization in order to support the needs of different functions of the organization.

During operation, the software update registry 102 is configured to intercept a software update package sent from one of the registered software vendors to an intended recipient inside the organization. Here, the intended recipient can be but is not limited to a server, an endpoint/client device, or any components in the organization's internal network/IT infrastructure where software can be installed and run. The software update package includes one or more executable or non-executable files or codes that can be utilized to install for the first time, re-install, or update a software to be executed on the intended recipient. The software update package may be provided to the intended recipient by the registered software vendor periodically based on a certain frequency or upon a request by the intended recipient, which is ready for a software update. Instead of providing the software update package directly to the intended recipient for installation, the software update registry 102 is configured to re-direct the software update package to the software update sandbox 104.

In the example of FIG. 1, the software update sandbox 104 is configured to accept the software update package redirected by the software update registry 102, unpack the software update package, and load/install a software update on the software update sandbox 104 by utilizing one or more files extracted from the software update package. Here, the software update sandbox 104 can be a physical computing device or a software (e.g., a virtual image of a system or a container) on the physical computing device, wherein the virtual container enables optimization and scalability of the software updates installed on the software update sandbox 104. In some embodiments, the software update sandbox 104 is only triggered upon receipt of the software update package from the software update registry 102 and is not affected, biased, limited, or manipulated by other constraints such as types and/or sizes of files in the software update package. In some embodiments, the software update sandbox 104 provides the same or similar running environment or setting as the intended recipient of the software update package via the virtual container in order to better emulate and monitor the behavior of the installed software update.

In some embodiments, the software update sandbox 104 is configured to monitor and analyze the behaviors of the software update dynamically over a period of time during unpacking, installation, and post-installation operations of the software update on the software update sandbox 104. As such, the software update sandbox 104 is configured to "detonate" the software update package by not trusting its content, loading the software update package, and monitor its behavior on the software update sandbox 104 to determine its risk regardless of the size of the software update package. Here, "detonation" means letting the software update "explode" (e.g., operate or function) safely on the software update sandbox 104 to expose any malicious behaviors in the software update sandbox 104 before making the software update package available for installation on the intended recipient. If no abnormal or malicious activities caused by the software update is detected, the software update sandbox 104 is configured to mark the software update package as safe (e.g., it does not contain or trigger any malicious component) and will forward the software update package to the intended recipient for installation. If, on the other hand, an abnormal or malicious activities caused by the software update is detected, the software update sandbox 104 is configured to uninstall the software update from the software update sandbox 104 and prevent the software update from being installed on the intended recipient or on any component within the internal network/IT infrastructure of the organization. In some embodiments, the software update sandbox 104 is configured to inform the software update registry 102 and/or a system administrator about the risk of cyberattacks originated from the software vendor that provide the software update package. In some embodiments, the software update sandbox 104 is configured to process the software update package synchronously, wherein the determination/verdict on the safety of the software update package is made at the same time as the software update package is installed and monitored on the software update sandbox 104. In some embodiments, the software update sandbox 104 is configured to process the software update asynchronously, wherein the software update sandbox 104 takes time to monitor the behavior of the software update installed on the software update sandbox 104 before making the software update available to the intended recipient.

In some embodiments, the system 100 in FIG. 1 includes a software update package safety check cache/mechanism 106, which takes determination/verdict on the software update package from the software update sandbox 104 as its input and keeps track of cache safety checks of all software update packages received from the software vendors. The software update package safety check cache/mechanism 106 serves as a lookup mechanism for both the vendors and the intended recipients of the software update packages to check if a software update package created/delivered or to be installed has not compromised by a hacker. In some embodiments, the software update package safety check cache/mechanism 106 is also configured to keep track the first attempt of a software is being installed on the software update sandbox 104. In some embodiments, the intended recipient is notified of a safe verdict on a software update package it is intended to receive, which will trigger the intended recipient to start downloading the software update package. In some embodiments, the intended recipient will first look up the software update package safety check cache/mechanism 106 to check the verdict on security risk of the latest available version of the software update. The intended recipient only proceeds to actually download and install the software update package if it is safe to do so as determined by the software update sandbox 104.

In some embodiments, the system 100 in FIG. 1 includes a software update proxy 108, which is either a proxy server or a link scanner configured to deliver the software update package to the intended recipient if the software update package has been determined by the software update sandbox 104 to be safe. In some embodiments, software update proxy 108 simplifies the need to configure the behavior and/or settings of the intended recipient because the software update proxy 108 can be made transparent to the intended recipient when handling the software update package. Note that the software update proxy 108 works under the assumption that the software update process is synchronous, wherein such synchronous software update process enforces various constraints on the software update sandbox 104, which may lower efficacy and detection rate of malicious behavior that may be present in the software update package.

Figure 2:
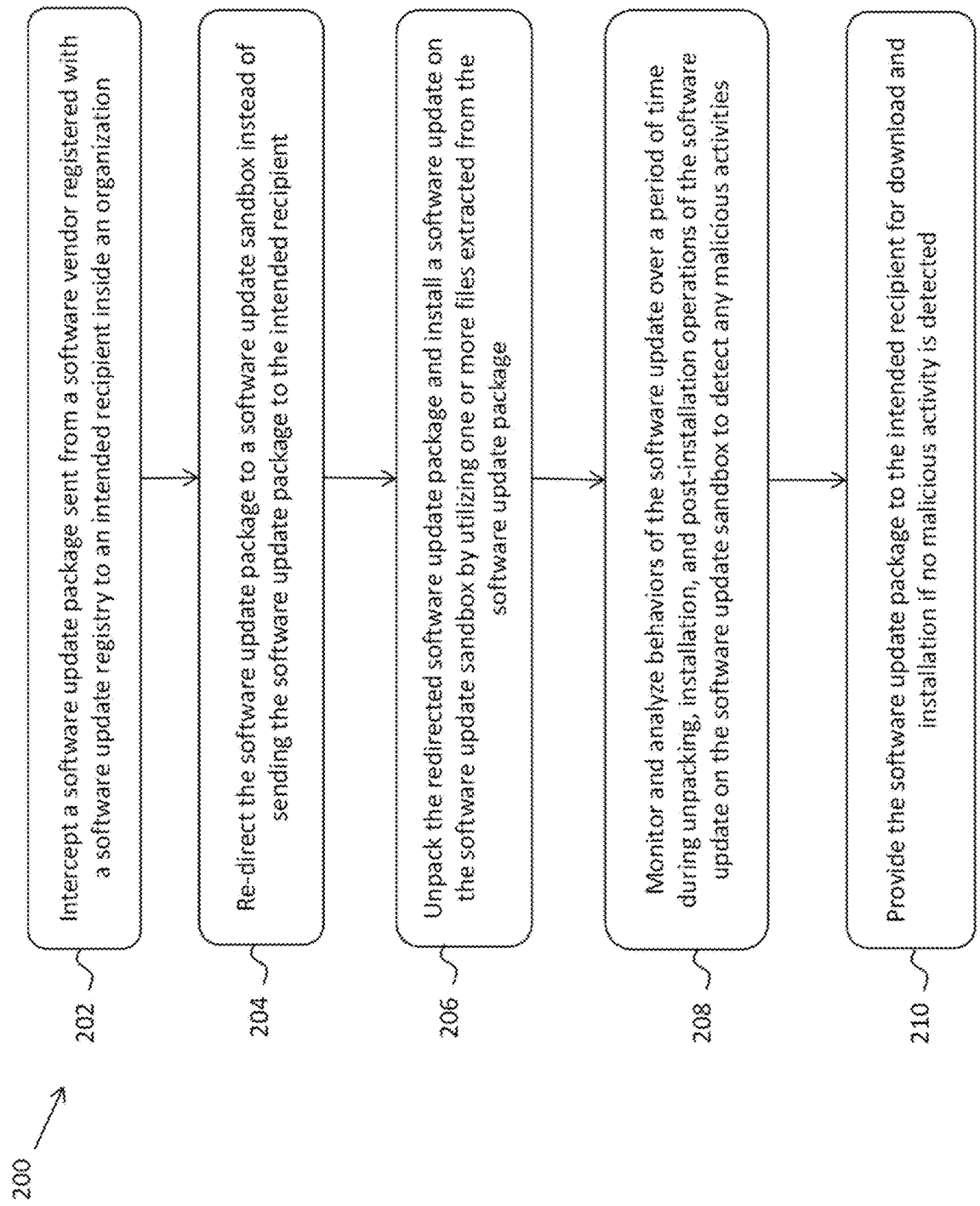
FIG. 2 depicts a flowchart of an example of a process to support software update verification and malicious behavior detection in accordance with some embodiments.

FIG. 2 depicts a flowchart 200 of an example of a process to support software update verification and malicious behavior detection. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a software update package sent from a software vendor registered with a software update registry to an intended recipient inside an organization is intercepted. The flowchart 200 continues to block 204, where the software update package is re-directed to a software update sandbox instead of sending the software update package to the intended recipient. The flowchart 200 continues to block 206, where the redirected software update package is unpacked and a software update is installed on the software update sandbox by utilizing one or more files extracted from the software update package. The flowchart 200 continues to block 208, where behaviors of the software update is monitored and analyzed over a period of time during unpacking, installation, and post-installation operations of the software update on the software update sandbox to detect any malicious activities. The flowchart 200 ends at block 210, where the software update package is provided to the intended recipient for download and installation if no malicious activity is detected.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support software update verification and malicious behavior detection, comprising:
   a software update registry configured to
      intercept a software update package sent from a software vendor registered with the software update registry to an intended recipient inside an organization;
      re-direct the software update package to a software update sandbox instead of sending the software update package to the intended recipient;
   said software update sandbox configured to
      unpack the software update package redirected by the software update registry and install a software update on the software update sandbox by utilizing one or more files extracted from the software update package;
      monitor and analyze behavior of the software update over a period of time during unpacking, installation, and post-installation operations of the software update on the software update sandbox to detect any malicious activities;
      provide the software update package to the intended recipient for download and installation if no malicious activity is detected.

2. The system of claim 1, wherein:
   the software update registry is configured to maintain, track and publish a plurality of software updates by one or more software vendors which have registered with the software update registry to provide updates or patches to software utilized by the organization.

3. The system of claim 1, wherein:
   the software update registry is a centralized service located at a gateway to an internal IT infrastructure of the organization.

4. The system of claim 1, wherein:
   the software update registry is a single entry of one or more entries to access different parts of the IT infrastructure depending on proximity of the one or more entries to actual workloads in the IT infrastructure.

5. The system of claim 1, wherein:
   the software update registry is a distributed service located at different locations of the organization to support different functions of the organization.

6. The system of claim 1, wherein:
   the software update package is provided by the registered software vendor periodically based on a certain frequency or upon a request by the intended recipient, which is ready for the software update.

7. The system of claim 1, wherein:
   the software update sandbox is a virtual image of a system on a physical computing device.

8. The system of claim 7, wherein:
   the software update sandbox provides the same or similar running environment or setting as the intended recipient of the software update package via the virtual image of the system.

9. The system of claim 1, wherein:
   the software update sandbox is not affected, biased, limited, or manipulated by other constraints such as types and/or sizes of files in the software update package.

10. The system of claim 1, wherein:
    the software update sandbox is configured to prevent the software update from being installed on the intended recipient if a malicious activity is detected.

11. The system of claim 1, wherein:
    the software update sandbox is configured to process the software update synchronously, wherein determination on the safety of the software update is made at the same time as the software update is installed and monitored on the software update sandbox.

12. The system of claim 1, wherein:
    the software update sandbox is configured to process the software update asynchronously, wherein the software update sandbox takes time to monitor the behavior of the software update installed on the software update sandbox before making the software update available to the intended recipient.

13. The system of claim 1, further comprising:
    a software update package safety check cache configured to maintain safety determination of the software update package received from the software vendors.

14. The system of claim 1, further comprising:
    a software update proxy configured to deliver the software update package to the intended recipient if the software update package has been determined to be safe.

15. A computer-implemented method to support software update verification and malicious behavior detection, comprising:
    intercepting a software update package sent from a software vendor registered with a software update registry to an intended recipient inside an organization;
    re-directing the software update package to a software update sandbox instead of sending the software update package to the intended recipient;
    unpacking the redirected software update package and installing a software update on the software update sandbox by utilizing one or more files extracted from the software update package;
    monitoring and analyzing behavior of the software update over a period of time during unpacking, installation, and post-installation operations of the software update on the software update sandbox to detect any malicious activities;
    providing the software update package to the intended recipient for download and installation if no malicious activity is detected.

16. The method of claim 15, further comprising:
    maintaining, tracking and publishing a plurality of software updates by one or more software vendors which have registered to provide updates or patches to software utilized by the organization.

17. The method of claim 15, further comprising:
    providing the software update package periodically based on a certain frequency or upon a request by the intended recipient, which is ready for the software update.

18. The method of claim 15, further comprising:
    providing the same or similar running environment or setting as the intended recipient of the software update package on the software update sandbox.

19. The method of claim 15, further comprising:
    preventing the software update from being installed on the intended recipient if a malicious activity is detected.

20. The method of claim 15, further comprising:
    processing the software update synchronously, wherein determination on the safety of the software update is made at the same time as the software update is installed and monitored on the software update sandbox.

21. The method of claim 15, further comprising:
    processing the software update asynchronously, wherein the software update sandbox takes time to monitor the behavior of the software update installed on the software update sandbox before making the software update available to the intended recipient.

22. The method of claim 15, further comprising:
maintaining safety determination of the software update package received from the software vendors via a software update package safety check cache.

23. The method of claim 15, further comprising:
delivering the software update package to the intended recipient via a software update proxy if the software update package has been determined to be safe.

\* \* \* \* \*